United States Patent [19]

Ohashi et al.

[11] Patent Number: 5,676,619
[45] Date of Patent: Oct. 14, 1997

[54] HYDRAULICALLY OPERATED VEHICLE TRANSMISSION

[75] Inventors: Tatsuyuki Ohashi; Hideo Furukawa, both of Wako, Japan

[73] Assignee: Honda Giken Kogyo Kabushiki Kaisha

[21] Appl. No.: 610,138

[22] Filed: Feb. 29, 1996

[30] Foreign Application Priority Data

Mar. 2, 1995 [JP] Japan ................... 7-068754

[51] Int. Cl.$^6$ ................... F16H 59/72; F16H 59/78
[52] U.S. Cl. ................... 477/98; 477/902
[58] Field of Search ................... 477/97, 98, 902; 475/117, 131, 132, 133

[56] References Cited

U.S. PATENT DOCUMENTS 5,489,247  2/1996  Markyvech et al. ............ 477/120

FOREIGN PATENT DOCUMENTS

| 59-37359 | 2/1984 | Japan . |
| 2-8545 | 1/1990 | Japan . |
| 6-74318 | 3/1994 | Japan . |

*Primary Examiner*—Charles A. Marmor
*Assistant Examiner*—Sherry Lynn Estremsky
*Attorney, Agent, or Firm*—Armstrong, Westerman, Hattori, McLeland & Naughton

[57] ABSTRACT

A hydraulic control system for a hydraulically operated vehicle transmission. The system is configured to have a first gearshift mode for determining a gear ratio to be shifted to in accordance with a predetermined gearshift schedule based on detected parameters and a second gearshift mode for changing a gear ratio in accordance with at least one of an upshift command and a downshift command given by the driver. The first mode or the second mode is selected. And when the engine coolant temperature is found to be less than a predetermined value, the selection is prohibited or invalidated. This is because when the temperature is low, the viscosity of the ATF may be high and the time taken for completion of the gearshift is long, causing the driver to sense a time lag between the point at which the command was output and the point at which the actual gearshift is conducted. In the first mode, the driver does not sense this kind of time lag because the gearshift command is output by an electronic control unit without the driver knowing when it was output.

4 Claims, 6 Drawing Sheets

HYDRAULICALLY OPERATED VEHICLE TRANSMISSION

BACKGROUND OF THE INVENTION

1. Field of the Invention

This invention relates to a control system for a hydraulically operated vehicle transmission, more particularly to a hydraulic control system for a hydraulically operated vehicle transmission selectively having an automatic gearshift mode which automatically shifts gears in accordance with gearshift scheduling characteristics predefined based on vehicle operating conditions and a driver command mode which enables the vehicle driver to shift up and down by issuing commands.

2. Description of the Prior Art

Prior-art hydraulically operated vehicle transmissions are provided with multiple ranges (positions), typically P, R, N, D4, D3, 2 and 1 ranges. In the automatic gearshift range D4, gearshift is conducted automatically in accordance with a gearshift schedule (a gearshift scheduling map) stored in advance in an on-board microcomputer memory, based on the vehicle speed and the throttle opening (engine load) as parameters indicating the vehicle operating condition. The driver ordinarily drives with the shift lever in the D4 range position. This prior-art automatic gearshift mode is commonly referred to as the autoshift mode or automatic gearshift command mode.

Since in the D4 range (the autoshift mode) gearshifting is conducted independently of any desire on the part of the driver, the driver manually moves the shift lever from the D4 range to the D3 or D2 range when desiring downshift to engage in sporty driving, utilize the braking effect of the engine, or the like. When the driver then desires to shift back up, he or she moves the shift lever to the D4 range. This means that the driver is required to frequently operate the shift lever when driving on a winding or hilly road.

Therefore, as taught by Japanese Laid-Open Patent Application Nos. Sho 59(1984)-37359, Hei 2(1990)-8545 and Hei 6(1994)-74318, there have been proposed automatic transmissions with a driver command mode which enables the driver to issue upshift and downshift commands by manual operation of a switch or lever provided separately of the shift lever. This driver command mode will be referred to as the "manual shift mode" or "manual gearshift command mode" in this specification.

In an automatic transmission, particularly a hydraulically operated automatic transmission, having a manual shift mode in addition to the autoshift mode, the state of the shift solenoid is switched starting from the time of the shift command and the shift valve then operates to conduct the gearshift. In this case, when the temperature of the drive unit including the transmission is low, more specifically when the temperature of the automatic transmission fluid (ATF) is low, the viscosity of the ATF is high and, accordingly, the time up to completion of the gearshift is long. During manual shift mode, therefore, the driver senses a time lag between the point at which the upshift or downshift command was issued and the point at which the actual gearshift is conducted. In the autoshift mode, the driver does not sense this kind of time lag because the gearshift command is issued by an electronic control unit without the driver knowing when it was issued.

SUMMARY OF THE INVENTION

An object of this invention is therefore to overcome the aforesaid problems of the prior art by providing a control system for a hydraulically operated vehicle transmission configured to have an autoshift mode and a manual shift mode, which, when the ATF temperature is estimated to be relatively low, makes it impossible to select the manual shift mode notwithstanding that selection is otherwise possible between the automatic gearshift mode (autoshift mode) in which gearshift is automatically conducted in accordance with predefined gearshift characteristics and the aforesaid driver command mode (manual shift mode) which enables the driver to issue upshift and downshift commands, thereby ensuring that the driver does not sense the aforesaid time lag.

This invention achieves this object by providing a hydraulic control system for a hydraulically operated vehicle transmission, comprising vehicle operating condition detecting means for detecting parameters indicative of operating conditions of the vehicle, an automatic gearshift command mode for changing a gear ratio to be shifted to in accordance with a predetermined gearshift schedule based on the detected parameters, to output a first gearshift command, a manual gearshift command mode for changing the gear ratio in response to at least one of an upshift command and a downshift command which is given through a device manually operated by a vehicle driver, a plurality of frictional engaging elements for selectively establishing one gear stage in the transmission, and selecting means for selecting the automatic gearshift command mode or the manual gearshift command mode. In the system, said hydraulic control system includes, temperature detecting means for detecting a temperature of a drive unit including the vehicle transmission, temperature comparing means for comparing the detected temperature with a predetermined value, and command selection prohibiting means for prohibiting or invalidating selection of the manual gearshift command mode when the detected temperature is found to be less than the predetermined value.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
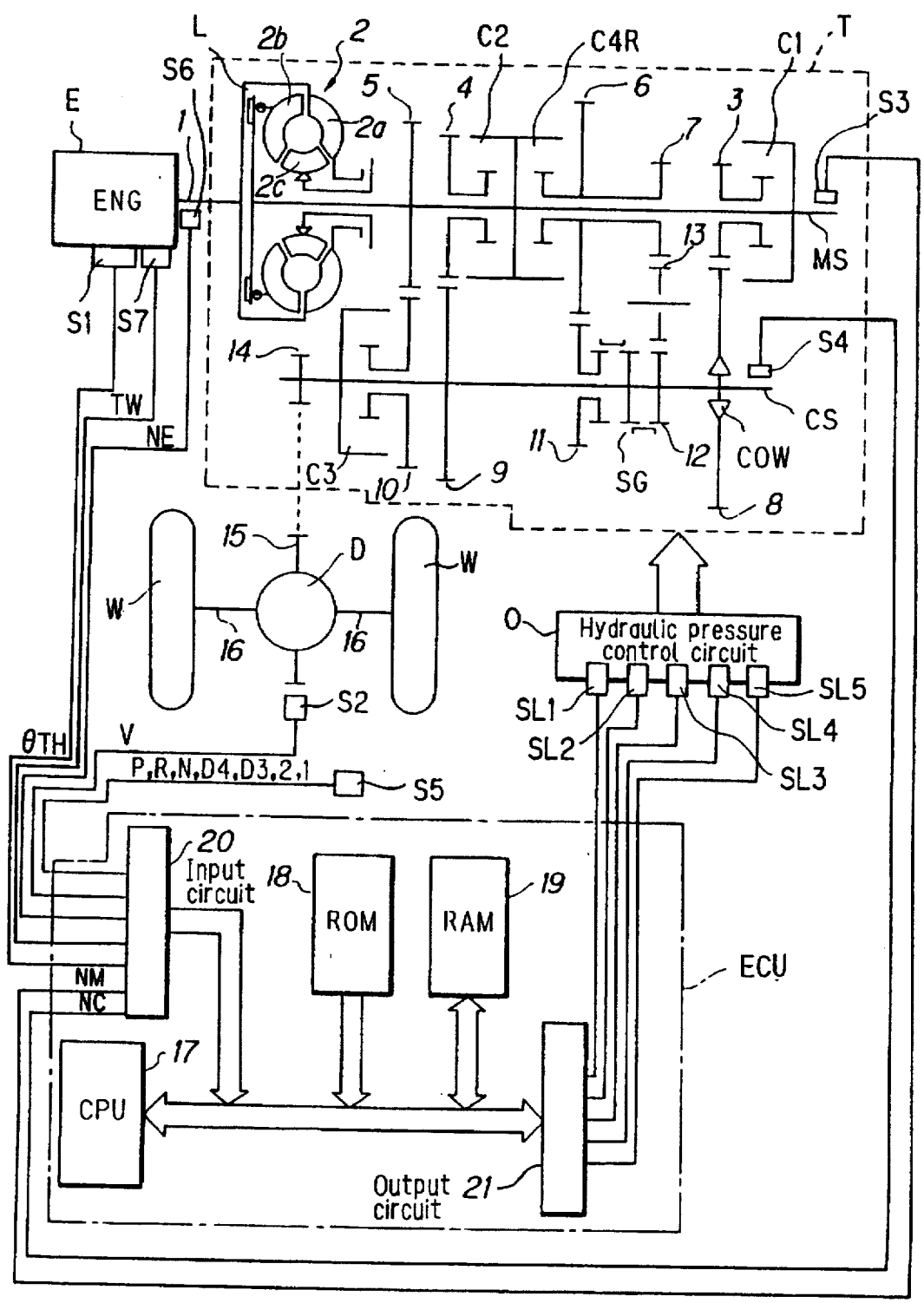
FIG. 1 is an overall view of a control system for a hydraulically operated vehicle transmission.

FIG. 1 is an overall view of the hydraulic pressure control system for a hydraulically operated vehicle transmission according to the invention.

As shown in FIG. 1, a vehicle automatic transmission T is equipped with a main shaft MS connected with a crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear (gear ratio or gear stage) is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 8 is supported by a one-way clutch COW. The second gear is established when the main second-speed gear 4 rotatably supported on the main shaft MS is connected with the main shaft MS by a second-speed hydraulic clutch C2. The third gear is established when the counter third-speed gear 10 rotatably supported on the countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R. The reverse gear is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed reverse hydraulic clutch C4R. The clutches C1, C2, C3 and C4R are the aforesaid frictional engaging elements.

The rotation of the countershaft CS is transmitted through a final drive gear 14 and a final driven gear 15 to a differential D, from where it is transmitted to driven wheels W, W through left and right drive shafts 16, 16.

A throttle position sensor S1 is provided in an air intake pipe (not shown) of the engine E at a point in the vicinity of a throttle valve (not shown) for detecting the degree of opening or position θTH of the throttle valve. A vehicle speed sensor S2 for detecting the vehicle traveling speed V from the rotational speed of the final driven gear 15 is provided in the vicinity of the final driven gear 15. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed NC of the transmission output shaft from the rotation of the counter-shaft CS.

A coolant temperature sensor S5 for detecting the engine coolant temperature TW is provided at an appropriate location on a cylinder block (not shown) of the engine E, and a crank angle sensor S6 is provided in the vicinity of the crankshaft 1 of the engine E for detecting the engine speed NE from the rotation of the crankshaft 1.

Figure 2:
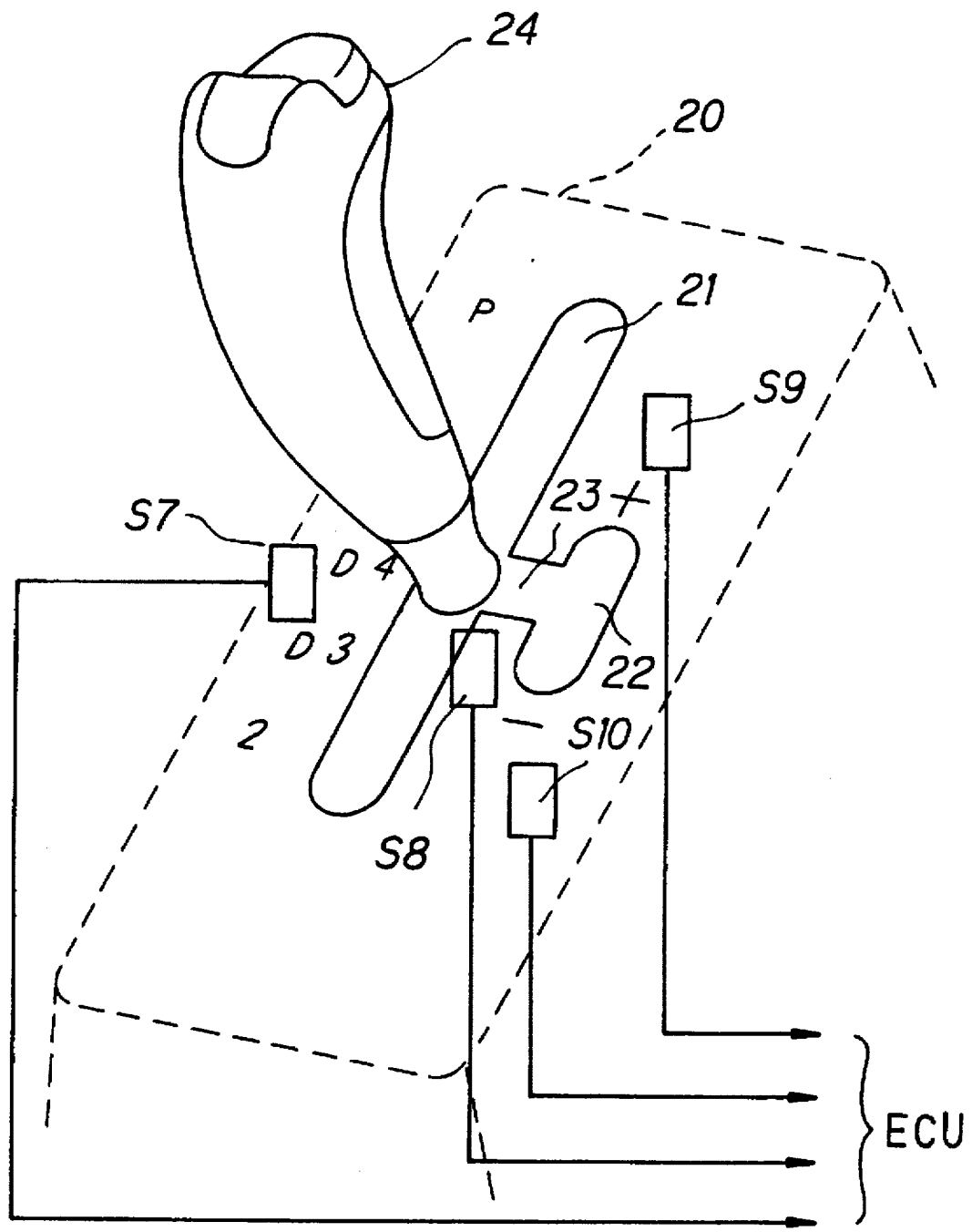
FIG. 2 is an explanatory view showing a selection mechanism of a manual gearshift mode (manual shift mode) and an automatic gearshift mode (autoshift mode) installed at a console box provided on the floor at a position near the driver's seat.

In addition, a console box 20, shown partially in FIG. 2 (but not in FIG. 1), is provided on the floor of the vehicle equipped with the internal combustion engine E at a position near the driver's seat (not shown). The console box 20 has a generally H-shaped slot consisting of a main select gate 21, a sub-select gate 22 and a passage 23 connecting them. A device manually operated by the vehicle driver, i.e., a shift lever 24 can be moved within the slot.

The main select gate 21 is for the conventional gearshift mode and by moving the shift lever 24 to appropriate positions therein, the driver can select any one of ranges (positions) P, R, N, D4, D3, 2 and 1. By moving the shift lever 24 to position D4 or D3, it is possible to select the autoshift mode in which gearshifting is conducted automatically by oil pressure operation based on the vehicle operating condition so as to shift among four forward gears in accordance with predefined gearshift scheduling characteristics.

The sub-select gate 22 is for the manual shift mode which enables the driver to issue commands for upshifting or downshifting among the four gears one gear at a time. More specifically, when, after moving the shift lever 24 from the gate 21 through the passage 23 to the gate 22, the driver moves it in the direction of the plus sign (+) in the figure, an electronic control unit (ECU) is sent or output a command to upshift one gear at a time, while when the driver moves the shift lever in the direction of the minus sign (−) in the figure, the ECU is sent a command to downshift one gear at a time. The ECU is explained later.

A shift lever position sensor S7 is installed at an appropriate location in the main select gate 21 for detecting the range (position) at which the shift lever 24 is positioned and a selected mode detection switch S8 is installed in the vicinity of the passage 23 for detecting whether the shift lever 24 is in the main select gate 21 or the sub-select gate 22, i.e., for detecting which of the autoshift mode and the manual shift mode is selected.

The sub-select gate 22 is further provided with an upshift switch S9 which turns on when the shift lever 24 is positioned in the upshift direction (+ direction), thereby detecting this state, and with a downshift switch S10 which turns on when the shift lever 24 is positioned in the downshift direction (− direction), thereby detecting this state.

If the driver releases the shift lever 24 when it is in the gate 22, it is restored to a neutral position near the middle of the gate 22 by a spring mechanism (not shown). The upshift switch S9 and downshift switch S10 are configured such that neither is on when the shift lever 24 is in the neutral position in the gate 22.

Thus, the embodiment is configured to have a first gearshift command issuing (or outputting) mode for determining a gear ratio to be shifted to in accordance with a predetermined gearshift scheduling characteristic based on the detected parameters, to issue or output a first gearshift command, and a second gearshift command issuing mode for detecting at least one of an upshift command instruction and a downshift command instruction given by the driver, to issue a second gear shift command in response to the detected instruction. As will be stated below, selection of the second gearshift command mode is forbidden or invalidated when the detected engine coolant temperature is found to be less than a prescribed value.

The outputs of the sensor S1 and other sensors are sent to the ECU (electronic control unit) mentioned earlier.

The ECU is constituted as a microcomputer comprising a CPU (central processing unit) 30, a ROM (read-only memory) 31, a RAM (random access memory) 32, an input circuit 33 and an output circuit 34. The outputs of the sensors S1, etc., are input to the microcomputer through the input circuit 33.

The CPU 30 of the microcomputer executes a gearshift routine (not shown) in accordance with the selected mode so as to determine the gear (gear ratio), energize/deenergize shift solenoids SL1, SL2 of a hydraulic control circuit 0 via the output circuit 34 so as to switch shift valves (not shown) and thereby engage/disengage the hydraulic clutches of prescribed gears, control the operation of a lockup mechanism L of the torque converter 2 through control solenoids SL3, SL4, and control the clutch oil pressure through the linear solenoid SL5.

Figure 3:
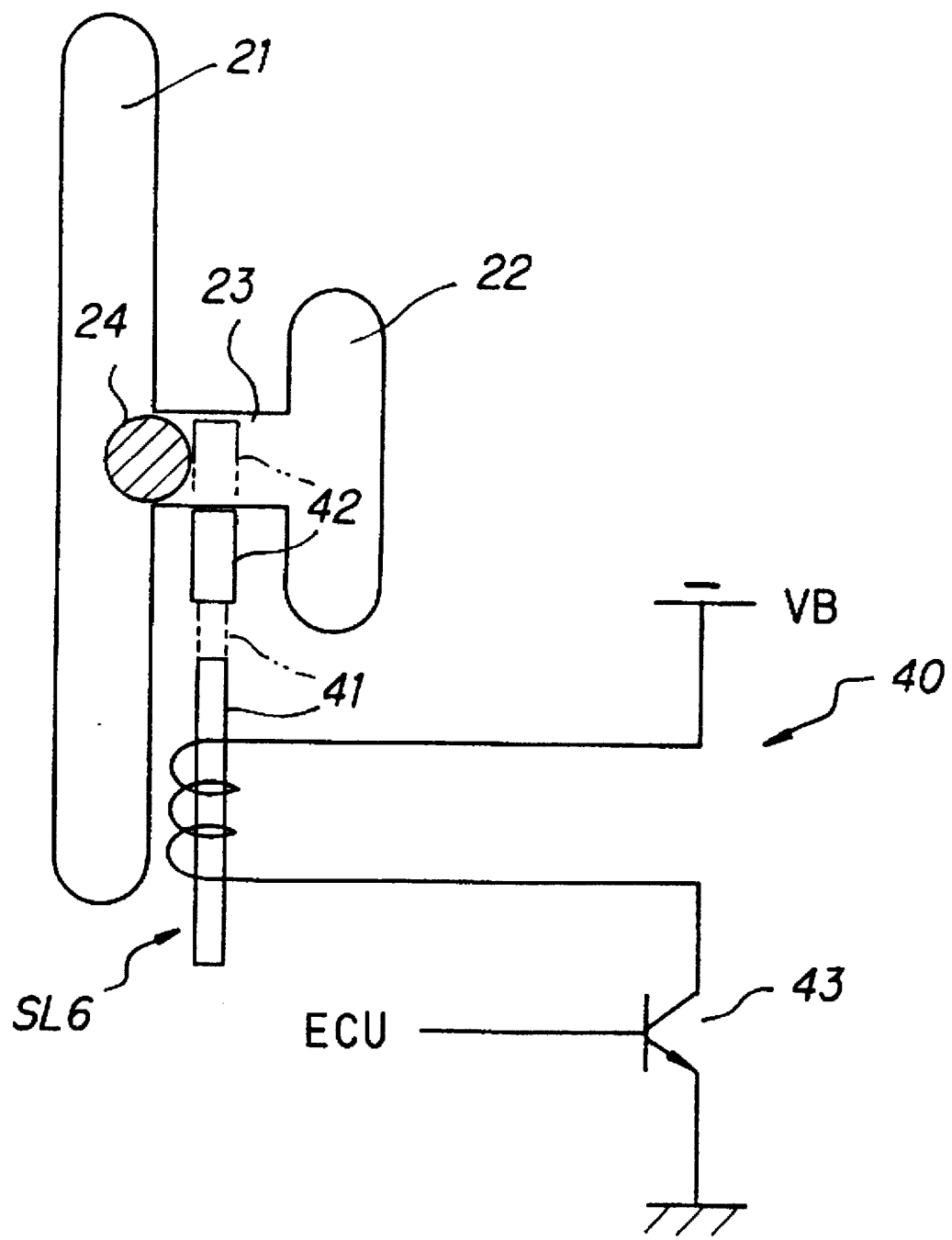
FIG. 3 is a explanation view of a manual shift mode selection forbidding circuit 40 which forbids the selection of the manual shift mode under prescribed conditions.

As shown in FIG. 3, moreover, a manual shift mode selection forbidding circuit 40 which forbids the selection of the aforesaid manual shift mode under prescribed conditions is provided in the vicinity of the passage 23.

The circuit 40 is equipped with a solenoid SL6 and a plunger 41 in contact with a pin 42. When the solenoid SL6 is energized, the plunger 41 projects to force the pin 42 into a projected position in the passage 23 as shown by the phantom line in FIG. 3. As a result, entry of the shift lever 24 into the sub-select gate 22 is forbidden. When the solenoid SL6 is deenergized, a spring (not shown) restores the pin 42 to its initial position outside the passage 23.

As illustrated, the solenoid SL6 is connected to the collector terminal of a transistor 43. When the ECU applies a positive voltage to the base terminal of the transistor 43, the solenoid SL6 is energized by the supply of direct current from a battery power source VB. Under prescribed conditions explained later, the CPU 30 energizes the solenoid SL6 to forbid entry of the shift lever 24 into the sub-select gate 22.

Figure 4:
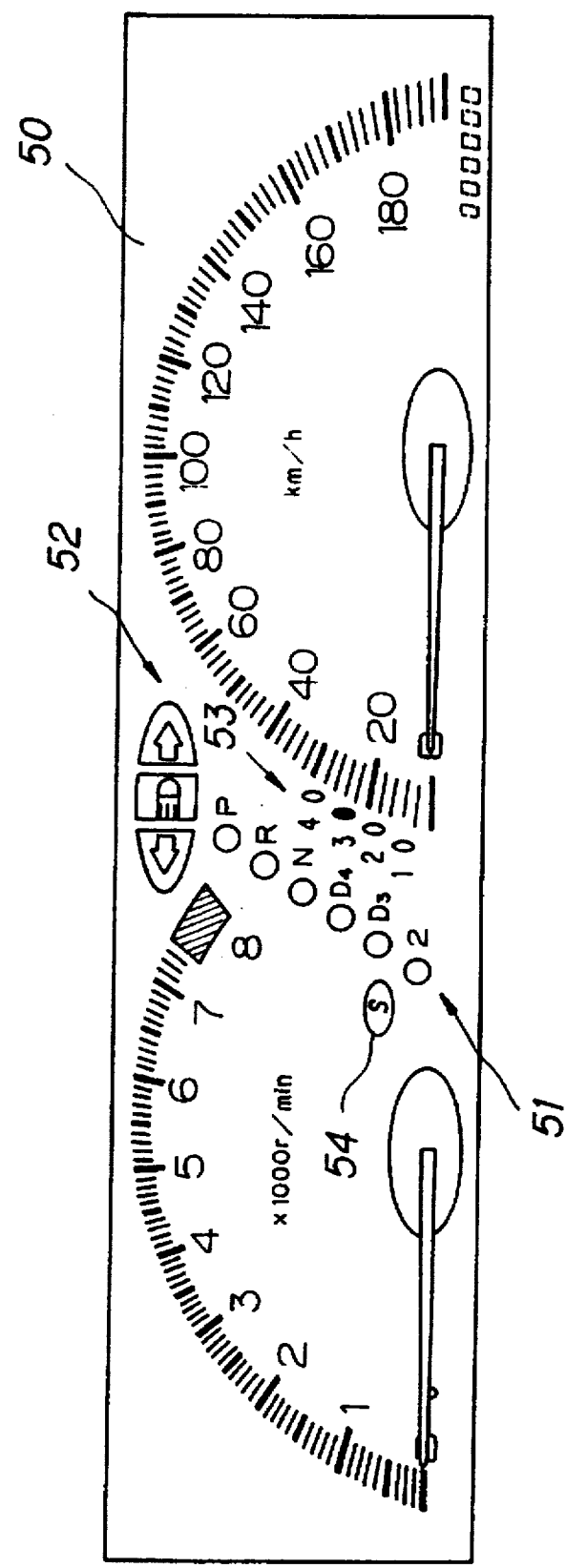
FIG. 4 is a partial front view of an instrument panel 50 visible from the driver's seat.

FIG. 4 is a partial front view of an instrument panel 50 visible from the driver's seat. When the autoshift mode is selected, the CPU 30 notifies the driver of the position of the shift lever 24 by lighting one of a row of lamps 51.

On the other hand, when the manual shift mode is selected, the CPU 30 notifies the driver of the position of the shift lever 24 in the sub-select gate 22 by lighting one of a row of lamps 52 and notifies the driver of the designated gear by lighting one of a row of lamps 53. It also lights a warning lamp 54 to notify the driver when entry of the shift lever 24 into the sub-select gate 22 is forbidden owing to energization of the solenoid SL6.

Figure 5:
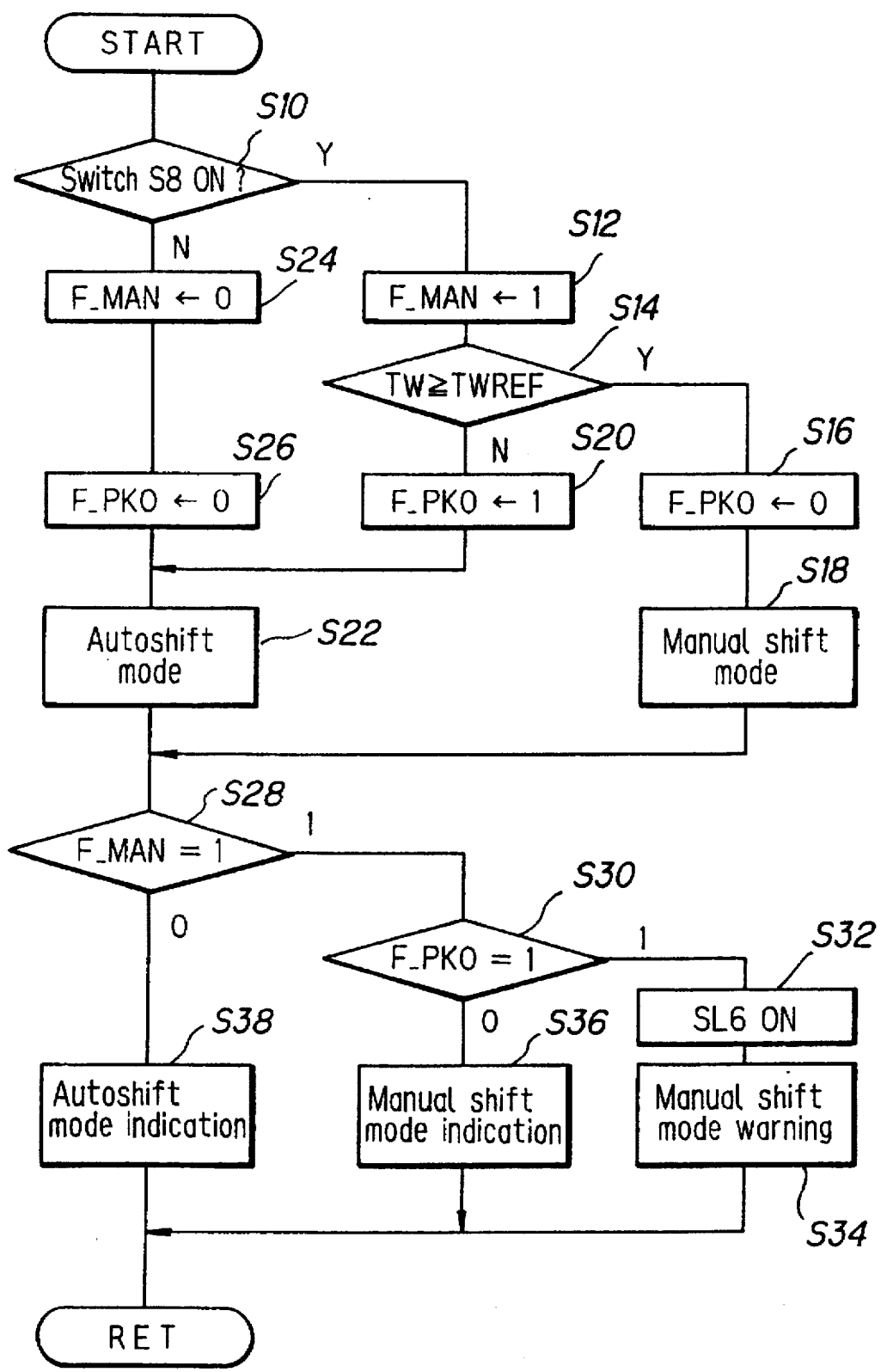
FIG. 5 is a flowchart showing the operation of the system illustrated in FIG. 1.

The operation of the control system will now be explained with reference to the flowchart of FIG. 5. The program is activated once every 20 ms.

First, in S10, it is checked based on the output of the selected mode detection switch S8 whether the manual shift mode is selected. When the result is YES, the program goes to S12, in which a flag F.MAN is set to 1, and then to S14, in which it is checked whether the engine coolant temperature TW is at or above a prescribed value TWREF. The prescribed value TWREF corresponds to the normal engine operating temperature.

When S14 finds the coolant temperature TW to be at or above the prescribed value TWREF, the program goes to S16, in which a second flag F.PKO is reset to 0, and to S18, in which the gearshift control mode is set to manual shift mode. The assumption here is that when the engine coolant temperature TW is at or above the normal engine operating temperature, the temperature of the ATF is not likely to be low, so that the shift valves and the like can be expected to operate in their rated operating times. The ATF temperature, more specifically the ATF viscosity, can thus be easily and accurately estimated by detecting the engine coolant temperature TW.

In the manual shift mode, the CPU 30 executes a gearshift control routine (not shown) which ascertains a driver command to upshift/downshift from the outputs of the upshift switch S9 and the downshift switch S10 and upshifts or downshifts from the current gear in accordance with the command.

The gearshift control in the manual shift mode enables the driver to use manual shifting for issuing successive commands for shifting one gear at a time. Downshift is allowed insofar as the predicted engine speed NE after gearshift is not excessive. In addition, a lower limit of the vehicle speed V is set for each gear and a downshift is automatically executed when the vehicle speed V is below the limit. In view of the basic purpose in providing the manual shift mode, upshift is not conducted automatically. To protect the engine, however, the supply of fuel is cut off at the upper limit of the engine speed NE. As in the case of low temperature, a switch is also made to the autoshift mode at time of system failure.

When S14 finds that the coolant temperature TW is below the prescribed value TWREF, the program goes to S20, in which the flag F.PKO is set to 1, and to S22, in which the gearshift control mode is set to autoshift mode. This is because the ATF temperature is considered to be low so that operating times of the shift valves and the like are likely to be long when the engine coolant temperature TW is below normal engine operating temperature.

In this case, the gear position is determined by retrieval from a gearshift scheduling map using the detected vehicle speed V and throttle opening (degree) θTH as address data. When S10 finds that the manual shift mode is not detected, the program goes to S24, in which the flag F.MAN is reset to 0, to S26, in which the flag F.PKO is reset to 0, and to S22.

From S22, the program goes to S28, in which it is checked whether the flag F.MAN is set to 1, i.e., whether the manual shift mode is selected. When the result in S28 is YES, the program goes to S30, in which it is checked whether the flag F.PKO is set to 1, in other words, whether the engine coolant temperature TW is below the prescribed value TWREF. When the result in S30 is YES, the program goes to S32, in which the solenoid SL6 is turned on (energized) to forbid (or prohibit) entry of the shift lever 24 into the gate 22 and thus forbid manual shift operation. Next, in S34, the driver is notified (or informed) of the situation by actuating a drive circuit (not shown) to light the warning lamp (informing means) 54 on the instrument panel.

On the other hand, when S30 finds that the flag F.PKO is not set to 1, i.e., that the engine coolant temperature TW was determined to be at or above the prescribed value TWREF, the program goes to S36, in which the driver is notified of the position of the shift lever 24 in the sub-select gate 22 by lighting one of the lamps 52 on the instrument panel and is notified of the designated gear by lighting one of the lamps 53.

When S28 finds that the flag F.MAN is not set to 1, i.e., that the manual shift mode is not selected, since it follows that the autoshift mode is selected, the program goes to S38, in which the driver is so notified by lighting one of the lamps 51. If desired, the system can be configured so as to also light one of the row of lamps 53 at this time.

As described in the foregoing, this invention is configured to forbid selection of the manual shift mode when the engine coolant temperature is below the normal engine operating temperature, namely, when the viscosity of the automatic transmission fluid (ATF) is considered to be high. so that the time required for gearshift is long. As a result, the driver is not given the impression of a time lag.

In addition, since the temperature of the drive unit including the transmission is estimated from the engine coolant temperature, it can be ascertained simply and accurately. Moreover, since the system is configured to notify the driver that selection of the manual shift mode is forbidden, the driver can implement alternative measures such at to delay the selection until the ATF temperature has risen and selection of the manual shift mode becomes possible.

A second embodiment of the invention not equipped with the solenoid SL6 will now be explained with reference to FIG. 6.

Figure 6:
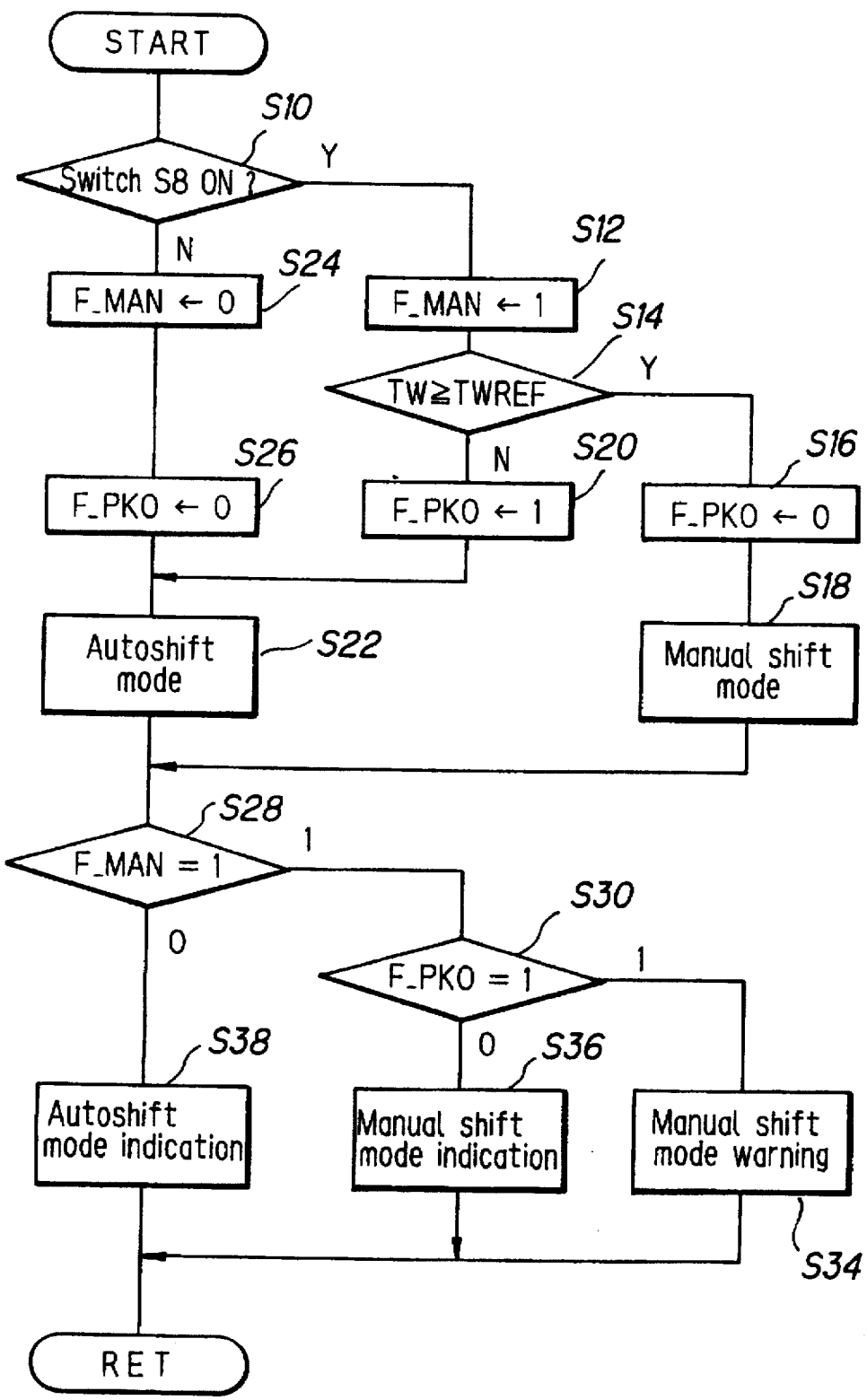
FIG. 6 is a flowchart showing the operation of the system according to a second embodiment of the invention.

In the flowchart of FIG. 6, when S10 finds that manual shift mode is selected and S14 finds that the engine coolant temperature is at or above the normal engine operating temperature, the program advances through S16 to S18, in which manual shift mode control is conducted, while when S14 finds that the engine coolant temperature is below the normal engine operating temperature, the program advances through S20 to S22, in which any command resulting from operation of the upshift switch or the downshift switch is canceled (invalidated) and autoshift mode control is conducted.

In the second embodiment, since the program advances through S20 to S22 and any command resulting from operation of the upshift switch or the downshift switch is canceled (invalidated) when S14 finds that the engine coolant temperature is below the prescribed temperature (TWREF), the solenoid SL6 for forbidding entry of the shift lever 24 into the sub-select gate 22 is unnecessary. This simplification of the configuration is advantageous in terms of lower cost.

Instead of lighting a lamp to issue a visual warning following the forbidding or invalidation processing in the foregoing embodiments, it is possible to issue an audible warning by use of a buzzer or other such alarm means. The issuance of a warning is, however, not a requisite of this invention.

In either of the foregoing embodiments it is possible to provide an ATF temperature sensor S11 for detecting the ATF temperature (as shown by the phantom line in FIG. 1), detect the temperature of the drive unit including the transmission from the ATF temperature rather than from the engine coolant temperature, compare the detected ATF temperature TATF with a prescribed value TATFREF in S14 of the flowchart, and, when it is lower, forcibly transfer to the autoshift mode in S22 after setting the flag F.PKO to 1 in S20. In this case, the prescribed value TATFREF is set to an appropriate value serving as an index of whether the time required to complete gearshift is the rated time.

In this case, the system is configured to forbid or invalidate the manual shift mode when the ATF temperature is below the prescribed value, because in such a case the viscosity of the ATF is high and the time required for completion of gearshift is long. Since detection of the ATF temperature enables more accurate estimation of the ATF viscosity, more specifically the time required for completion of gearshift, it becomes possible to prevent the driver from feeling a time lag with even higher certainty.

While the foregoing embodiments utilize the mechanism shown in FIG. 2 for the manual shift mode and the autoshift mode, it is instead possible to provide a switch or lever for manual shifting separately of the shift lever at a location where it can be easily operated by the driver, such as on the instrument panel, the steering column or the steering wheel, and it is also possible to forbid operation of the manual shift switch or lever constituted separately of the shift lever or to cancel input of the manual shift signal therefrom when the temperature of the drive unit is low.

While the ATF viscosity is estimated from the detected coolant temperature or ATF temperature in the foregoing embodiments, it is instead possible to estimate it from the engine oil temperature, the transmission case temperature or the engine cylinder block temperature. It is also possible to estimate the ATF viscosity from the time elapsed after the ignition was turned on rather than from the detected engine coolant temperature or ATF temperature.

Although the invention has thus been shown and described with reference to specific embodiments, it should be noted that the invention is in no way limited to the details of the described arrangements, changes and modifications may be made without departing from the scope of the invention, which is defined by the appended claims.

What is claimed is:

1. A hydraulic control system for a hydraulically operated vehicle transmission, comprising:

vehicle operating condition detecting means for detecting parameters indicative of operating conditions of the vehicle;

an automatic gearshift command mode for changing a gear ratio to be shifted to in accordance with a predetermined gearshift schedule based on the detected parameters, to output a first gearshift command;

a manual gearshift command mode for changing the gear ratio in response to at least one of an upshift command and a downshift command which is given through a device manually operated by a vehicle driver;

a plurality of frictional engaging elements for selectively establishing one gear stage in the transmission; and selecting means for selecting the automatic gearshift command mode or the manual gearshift command mode;

wherein said hydraulic control system includes:
temperature detecting means for detecting a temperature of a drive unit including the vehicle transmission;
temperature comparing means for comparing the detected temperature with a predetermined value; and
command selection prohibiting means for prohibiting or invalidating selection of the manual gearshift command mode when the detected temperature is found to be less than the predetermined value.

2. A system according to claim 1, wherein said temperature detecting means detects the temperature by at least one of an engine coolant temperature and an ATF temperature.

3. A system according to claim 2, wherein said command selection prohibiting means includes an informing means for informing the driver that the selection of the manual gearshift command mode is prohibited or invalidated.

4. A system according to claim 1, wherein said command selection prohibiting means includes an informing means for informing the driver that the selection of the manual gearshift command mode is prohibited or invalidated.

* * * * *